United States Patent [19]
Hauff et al.

[11] Patent Number: 5,826,886
[45] Date of Patent: Oct. 27, 1998

[54] WALL FEEDTHROUGH FITTING

[75] Inventors: Werner Hauff, Ballmertshofen; Gerhard Gauland, Heidenheim; Ernst Seifried, Kleinaitingen, all of Germany

[73] Assignee: Hauff-Technik GmbH & Co. KG, Herbrechtingen, Germany

[21] Appl. No.: 774,904

[22] Filed: Dec. 27, 1996

[30] Foreign Application Priority Data

Jan. 11, 1996 [DE] Germany .......................... 196 00 751.8
Feb. 3, 1996 [DE] Germany .......................... 196 03 914.2

[51] Int. Cl.$^6$ ..................................................... F16L 21/02
[52] U.S. Cl. .......................... 277/314; 277/315; 277/316; 277/604; 277/607; 277/616
[58] Field of Search ..................................... 277/314, 315, 277/316, 604, 607, 616, 625, 626, 630, 634; 52/220.8

[56] References Cited

U.S. PATENT DOCUMENTS 4,086,736  5/1978  Landrigan .
4,538,389  9/1985  Heinen .
4,836,558  6/1989  Anderson et al. .
4,946,175  8/1990  Nordin et al. .
5,529,312  6/1996  Skinner et al. .
5,540,450  7/1996  Hayashi et al. .
5,667,224  9/1997  Streckert et al. .

FOREIGN PATENT DOCUMENTS 195 34 484  8/1996  Germany .

Primary Examiner—Randolph A. Reese
Assistant Examiner—John L. Beres
Attorney, Agent, or Firm—Herbert Dubno; Andrew Wilford

[57] ABSTRACT

An anchored guide tube centered on an axis and a conduit passing axially through the tube are relatively sealed by a feedthrough fitting having a flexible and shrinkable sleeve having an inner portion secured to an outer surface of the guide tube at an end thereof and a outer portion folded back over the inner portion and forming an annular fold generally at the tube end. A lubricant or the like is provided for facilitating sliding of the outer portion on the inner portion from a storage position folded back over and lying on the inner portion and a use position extending outward past the tube end away from the inner portion.

13 Claims, 3 Drawing Sheets

WALL FEEDTHROUGH FITTING

FIELD OF THE INVENTION

The present invention relates to a wall feedthrough fitting. More particularly this invention concerns a system for sealing a conduit in a guide tube normally mounted in a wall.

BACKGROUND OF THE INVENTION

When a conduit—an electrical, coaxial, or fiber-optic cable, a hose, or the like—must pass through a wall it is standard to fit the wall with a guide tube of substantially larger inside diameter than the outside diameter of the conduit. Such a guide tube can simply be cast into place in a concrete wall with its ends projecting from the respective faces of the wall.

After the conduit is snaked through the tube it is normally necessary to provide a tight seal between the tube and the conduit. Such a seal is typically needed to act as a fire stop, that is to prevent a fire on one side of the wall from propagating through the guide tube to the other side of the wall.

German patent 195 34 484 describes such a seal which is carried in the tube and compressed to squeeze radially inward and tightly engage the conduit. A threaded sleeve arrangement that is operated by a gear tool is used to effect the compression, so that the entire assembly is fairly complex and expensive. In addition the seal occupies some space inside the tube so same must be dimensioned large enough for the seal structure.

It has therefore been suggested that recourse be had to shrink sleeves that are fitted over the guide tube and cable and then heated so that they shrink tightly into place, forming a very good seal. Such seals are typically delivered in stretched condition mounted on a coil that holds them open and that is used to install them. Once in place the support coil is screwed out and then the sleeve is heated, normally by application of hot air, for the final installation.

The problem with this system is that the shrink sleeve must be threaded over the tube and conduit, so that it is virtually impossible to avoid getting dirt and other foreign matter inside the sleeve, which foreign matter is spread around as the coil is withdrawn. The coil itself presents a disposal problem, and such a sleeve cannot normally conform tightly to longitudinally grooved or ribbed conduits.

OBJECTS OF THE INVENTION

It is therefore an object of the present invention to provide an improved wall feedthrough fitting.

Another object is the provision of such an improved wall feedthrough fitting which overcomes the above-given disadvantages, that is which is simple and inexpensive.

A further object is to provide an improved system and method for sealing a conduit with respect to a guide tube anchored in a wall or the like.

SUMMARY OF THE INVENTION

An anchored guide tube centered on an axis and a conduit passing axially through the tube are relatively sealed by a feedthrough fitting having according to the invention a flexible and shrinkable sleeve having an inner portion secured to an outer surface of the guide tube at an end thereof and a outer portion folded back over the inner portion and forming an annular fold generally at the tube end. A lubricant or the like is provided for facilitating sliding of the outer portion on the inner portion from a storage position folded back over and lying on the inner portion and a use position extending outward past the tube end away from the inner portion.

Thus with this arrangement the sleeve is wholly out of the way during installation of the conduit through the guide tube. It is no problem to thread the conduit, or even several conduits, through the guide tube without contacting the shrink sleeve. Only once the conduit is in place is the outer portion inverted and then shrunk onto the conduit. In fact it makes it possible to even clean the conduit at the location where it will be engaged by the shrink sleeve to ensure a hermetic sealing. Furthermore there is nothing to dispose of as the support coil has been eliminated. Since the outer portion is stretched over the inner portion, it is not likely to shrink because of environmental factors before it is pulled out.

According to the invention an adhesive secures the inner portion on the outer surface of the guide tube. In addition an inner collar is provided between the portions, an outer collar surrounds the sleeve outside the outer portion, and a web interconnects the collars at ends thereof remote from the tube end. The web and collars are integrally connected together and the outer collar has an outer end extending axially outward past an outer end of the inner collar. The outer collar further is provided at its outer end with an inwardly extending outer ring covering a gap between the inner and outer collars. This outer ring has an inner diameter substantially equal to an inner diameter of the tube. Thus these collars effectively protect and shield the sleeve prior to its final installation. Thus the guide tube equipped with the seal assembly can be cast into a wall without worrying about getting foreign matter on the sleeve. Once the installation is complete with the conduit threaded through the sleeve, the user merely pulls out the collar subassembly to invert the outer sleeve portion, and then pushes the collar subassembly back into place, making for a very neat installation.

The outer portion carries on an outer surface that is turned inward in the use position a mass of sealant. In addition the sleeve carries on the sealant mass a cover sheet attached to the collars so that when the sleeve is moved to the use position the cover sheet is stripped from the sealant mass.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
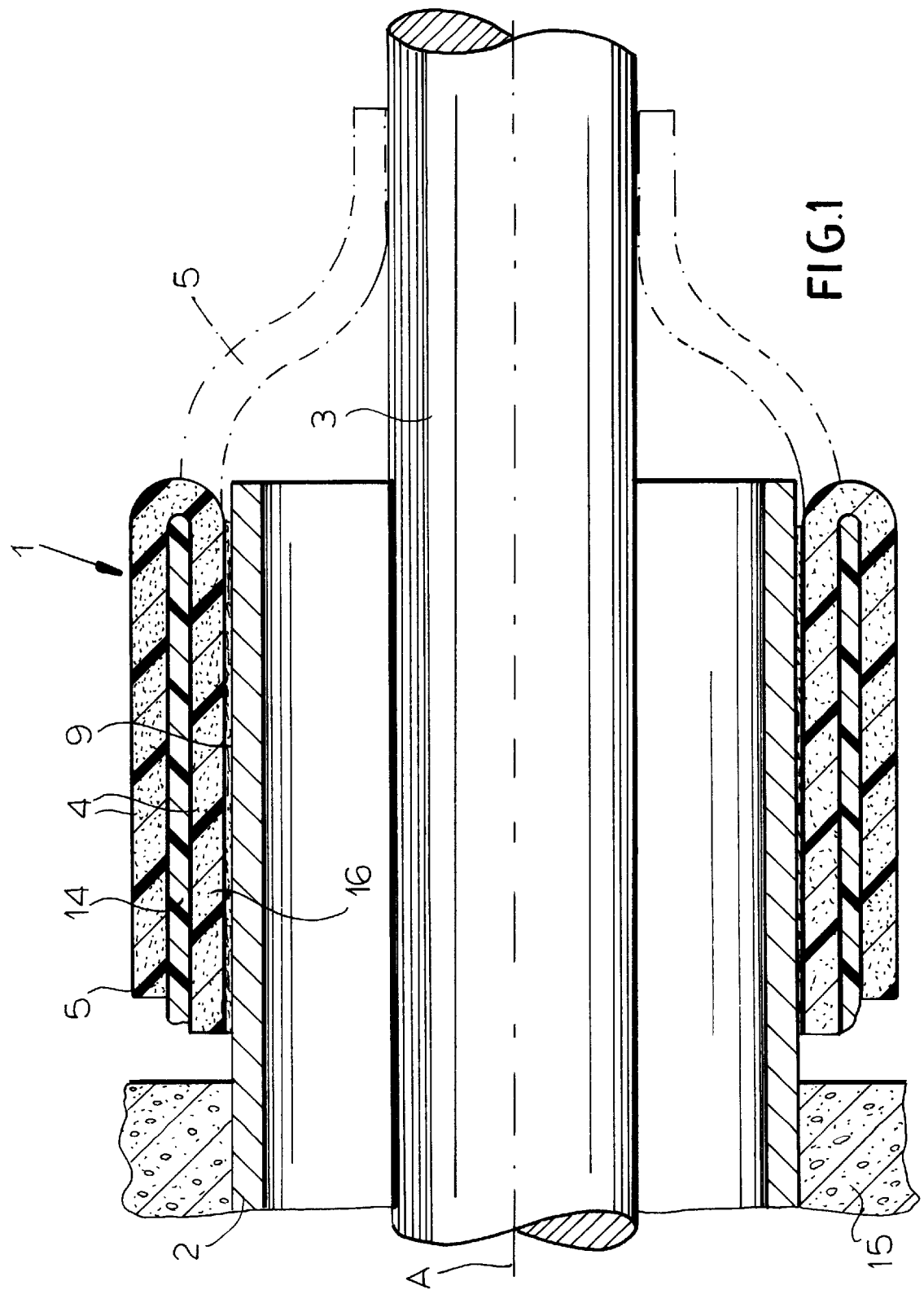
FIG. 1 is a large-scale axial section through a feedthrough fitting according to the invention.

As seen in FIG. 1 a cylindrical guide tube 2 is set in a wall 15 centered on an axis A and a conduit 3, here a cable, is passed axially through the tube 2. A seal 1 is provided for closing the annular gap between the conduit 3 and tube 2. This seal 1 is formed basically of a flexible and heat-shrinkable sleeve 4 having an inner portion 16 secured by an adhesive 9 to the outside of the tube 2 and a outer portion 5 that is, to start with, folded back over the portion 16 with the fold at the outer end of the tube 2. A layer 14 of antifriction material such as a lubricant or slippery plastic is provided between the portions 5 and 16.

This system is used by mounting the tube 2 in the wall 15 with its projecting end provided with the seal 1 as shown in solid lines in FIG. 1. After the conduit 3 is fitted through the tube 2 the outer portion 5 is pulled out and then heated so it shrinks tightly around the conduit 3 as shown in dot-dash lines.

Figure 2:
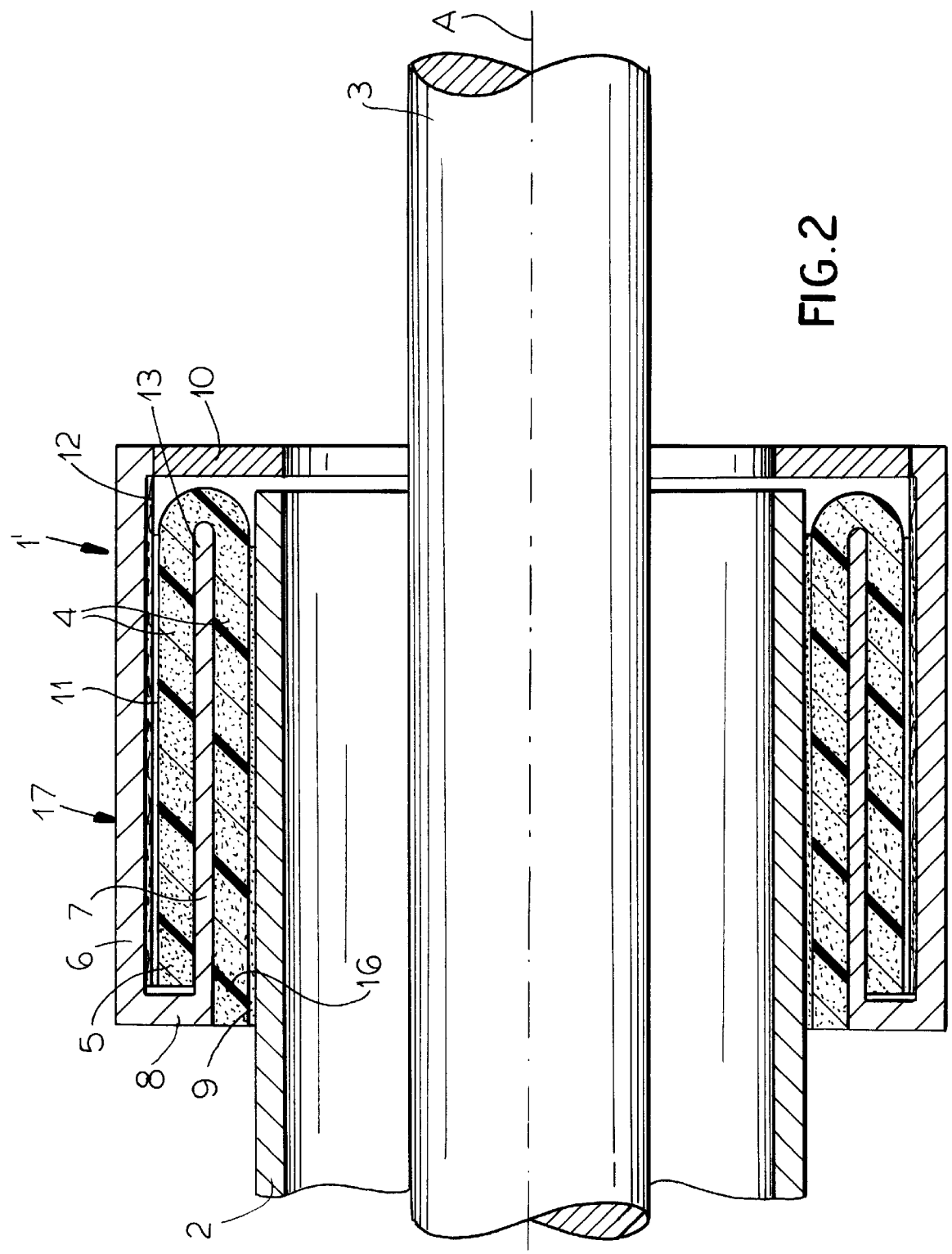
FIG. 2 is a view like FIG. 1 of another fitting in accordance with the invention prior to completion.
Figure 3:
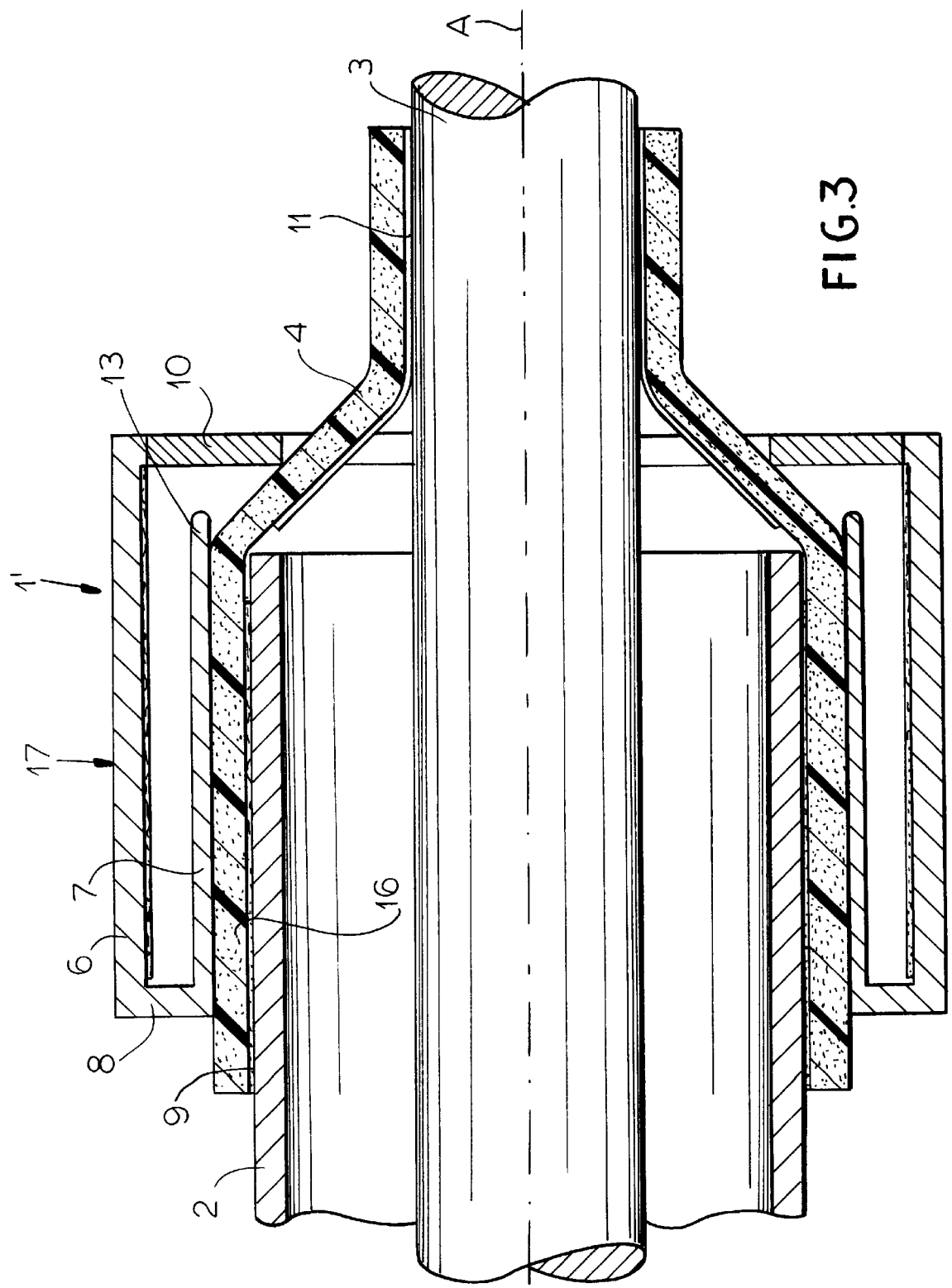
FIG. 3 is a view like FIG. 2 but showing the fitting after completion of the installation.

In the arrangement of FIGS. 2 and 3, where reference numerals identical to those of FIG. 1 stand for identical structure, a seal 1' has a rigid holder fitting 17 formed by coaxial inner and outer tubularly cylindrical collars 6 and 7 interconnected at one end by a ring 8 and having another ring 10 projecting radially inward from the opposite end of the outer collar 6 which extends axially outward past an outer end 13 of the inner collar 7. The inner collar 7 lies between the outer and inner portions 5 and 16 of the sleeve 4 with the outer end 13 of the collar 7 engaged at the fold between the portions 5 and 16. The outer ring 10 can be threaded into the outer end of the outer collar 6 and has an inner periphery that is of the same diameter as the inner surface of the tube 2 so as to form a sight hole for insertion of the conduit 3.

The surface of the outer portion 5 that is turned outward when it is folded back over the inner portion 16 as shown in FIG. 2 and inward when pulled out as shown in FIG. 2a is covered with a sticky sealant 11 in turn covered by a strip paper 12 secured to the inside surface of the outer collar 6. As in FIG. 1, the sleeve 4 is formed of a heat-shrinkable synthetic resin.

For use the fitting 17 is pulled outward, that is to the right in the drawing. This action strips the paper 12 off the sealant layer 11 while inverting the portion 5. Once it is shrunk down against the conduit 3 the sealant layer 11 will engage it snugly and form a hermetic seal. The fitting 17 is pushed back into its starting position once the sleeve 4 is shrunk to offer a further degree of protection and give the assembly a very neat appearance.

We claim:

1. In combination with an anchored guide tube centered on an axis and a conduit passing axially through the tube, a feedthrough fitting comprising:
    a flexible and shrinkable sleeve having an inner portion secured to an outer surface of the guide tube at an end thereof and an outer portion folded back over the inner portion and forming an annular fold generally at the tube end; and
    means for facilitating sliding of the outer portion on the inner portion from a storage position folded back over and lying on the inner portion and a use position extending outward past the tube end away from the inner portion.

2. The combination defined in claim 1 wherein the means is a lubricant.

3. The combination defined in claim 1, further comprising an adhesive securing the inner portion on the outer surface of the guide tube.

4. The combination defined in claim 1, further comprising:
    an inner collar between the portions and constituting the means;
    an outer collar surrounding the sleeve outside the outer portion; and
    a web interconnecting the collars at ends thereof remote from the tube end.

5. The combination defined in claim 4 wherein the web and collars are integrally connected together.

6. The combination defined in claim 4 wherein the outer collar has an outer end extending axially outward past an outer end of the inner collar.

7. The combination defined in claim 6 wherein the outer collar is provided at its outer end with an inwardly extending outer ring covering a gap between the inner and outer collars.

8. The combination defined in claim 7 wherein the outer ring has an inner diameter substantially equal to an inner diameter of the tube.

9. The combination defined in claim 4 wherein the outer portion carries on an outer surface that is turned inward in the use position a mass of sealant.

10. The combination defined in claim 9 wherein the sleeve carries on the sealant mass a cover sheet attached to the collars, whereby when the sleeve is moved to the use position the cover sheet is stripped from the sealant mass.

11. In combination with an anchored guide tube centered on an axis and a conduit passing axially through the tube, a feedthrough fitting comprising:
    a flexible and shrinkable sleeve having an inner portion on an outer surface of the guide tube at an end thereof and a outer portion folded back over the inner portion and forming an annular fold generally at the tube end;
    an adhesive fixing the inner portion to the outer surface of the guide tube;
    an inner collar between the portions;
    an outer collar surrounding the sleeve outside the outer portion;
    an inner ring interconnecting and fixing together the collars at ends thereof remote from the tube end; and
    an outer ring projecting radially inward from an outer end of the outer collar and generally enclosing the outer portion in a storage position with the outer portion folded back over and lying on the inner collar, the outer portion being movable into a use position extending outward past the tube end away from the inner portion.

12. A method of sealing between an anchored guide tube centered on an axis and a conduit, the method comprising the steps of sequentially:
    providing on an end of the guide tube a flexible and shrinkable sleeve having an inner portion on an outer surface of the guide tube at an end thereof and a outer portion folded back over the inner portion and forming an annular fold generally at the tube end and fixing the inner portion to the outer surface of the tube;
    passing the conduit axially through the tube and through the sleeve;
    inverting the outer portion of the sleeve into a use position extending outward past the tube end away from the inner portion; and
    heating the outer portion of the sleeve to shrink it around the conduit.

13. The method defined in claim 12, further comprising the step of
    providing on the tube outer end a fitting having
        an inner collar between the portions,
        an outer collar surrounding the sleeve outside the outer portion, and
        a web interconnecting the collars at ends thereof remote from the tube end,
    the outer portion being inverted by drawing the collars axially outward; and
        pushing the fitting back onto the tube outer end after heating and shrinking the sleeve.

* * * * *